US012585283B2

(12) United States Patent
Kamiya et al.

(10) Patent No.: US 12,585,283 B2
(45) Date of Patent: Mar. 24, 2026

(54) CONTROL METHOD AND CONTROL SYSTEM

(71) Applicant: Panasonic Intellectual Property Management Co., Ltd., Osaka (JP)

(72) Inventors: Yoshihiko Kamiya, Osaka (JP); Motoshi Anabuki, Hyogo (JP); Yuki Matsumura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 113 days.

(21) Appl. No.: 18/520,938

(22) Filed: Nov. 28, 2023

(65) Prior Publication Data

US 2024/0094745 A1    Mar. 21, 2024

Related U.S. Application Data

(63) Continuation of application No. PCT/JP2022/007797, filed on Feb. 25, 2022.

(30) Foreign Application Priority Data

Jun. 7, 2021    (JP) ................................. 2021-095372

(51) Int. Cl.
G05D 1/224      (2024.01)
G05D 109/10     (2024.01)
G06Q 10/0639    (2023.01)

(52) U.S. Cl.
CPC ....... *G05D 1/224* (2024.01); *G06Q 10/06398* (2013.01); *G05D 2109/10* (2024.01)

(58) Field of Classification Search
CPC ................. G05D 1/224; G05D 1/2279; G06Q 10/06398; G06Q 10/0631; G06Q 10/06;
(Continued)

(56) References Cited

U.S. PATENT DOCUMENTS

2014/0207503 A1*   7/2014   Reis ................. G06Q 10/06311
                                                    705/7.13
2019/0287394 A1*   9/2019   Aoude ................... G08G 1/123
(Continued)

FOREIGN PATENT DOCUMENTS

CN      110998647      4/2020
JP      2007-79631      3/2007
(Continued)

OTHER PUBLICATIONS

Extended European Search Report issued Jul. 23, 2024 in corresponding European Patent Application No. 22819828.9.
(Continued)

*Primary Examiner* — Scott A Browne
*Assistant Examiner* — Jisun Choi
(74) *Attorney, Agent, or Firm* — Wenderoth, Lind & Ponack L.L.P.

(57) ABSTRACT

A control method includes the following. First information indicating a group control level is determined based on operation skills of operators who each perform remote monitoring or remote operation on a moving body. Second information indicating an attribute-dependent control level is determined based on attribute information on the operators. Third information indicating individual control levels of the operators is determined based on the first and second information. Moving bodies present within a predetermined range from a predetermined notification device are identified. Fourth information indicating a device control level is determined based on the third information determined for operators of the moving bodies identified. A detail of notification to be output from the predetermined notification device is determined based on the fourth information. A control command for notifying of the detail is output.

9 Claims, 10 Drawing Sheets

(58) Field of Classification Search
CPC ... G06Q 10/063112; G06Q 10/063114; G06Q
10/063118; G06Q 10/0639; G08G
1/096725; G08G 1/096741
See application file for complete search history.

(56) References Cited

U.S. PATENT DOCUMENTS

| | | | |
|---|---|---|---|
| 2020/0241559 A1 | 7/2020 | Yoneda et al. | |
| 2021/0016795 A1 | 1/2021 | Matsushita et al. | |
| 2021/0375080 A1* | 12/2021 | Kumar | G05D 1/644 |
| 2022/0164754 A1* | 5/2022 | Sasaki | G06Q 10/063112 |

FOREIGN PATENT DOCUMENTS

| | | |
|---|---|---|
| JP | 2010-9299 | 1/2010 |
| WO | 2019/023697 | 1/2019 |

OTHER PUBLICATIONS

International Search Report (ISR) issued on May 10, 2022 in International (PCT) Application No. PCT/JP2022/007797.
Communication pursuant to Article 94(3) EPC issued Apr. 24, 2025 in European Patent Application No. 22 819 828.9.

* cited by examiner

FIG. 8

| Operator information ip | | | | | |
|---|---|---|---|---|---|
| Name | ID | Operation skill | Attribute information | State | Monitoring vehicle |
| A | AAA | Skilled operator P1 | ... | Active | t1 |
| B | BBB | Ordinary operator P2 | ... | Active | t2 |
| C | CCC | Ordinary operator P2 | ... | Inactive | — |
| ... | ... | ... | ... | ... | ... |

FIG. 9

| Percentage of ordinary operators | Group control level L1 |
|---|---|
| Less than 40% | Low |
| 40% or more and less than 60% | Medium |
| 60% or more | High |

FIG. 10

| Attribute information ia on operator | | Attribute-dependent control level L2 |
|---|---|---|
| Remote Operator Certificate | | |
| | Grade 1 | Low |
| | Grade 2 | Medium |
| | Grade 3 | High |
| Experience | | ... |
| Amount of work in progress | | ... |
| Details of work in progress | | ... |

FIG. 11

| Group control level L1 | Attribute-dependent control level L2 | | Individual control level L3 |
|---|---|---|---|
| Medium | Low | ⇨ | Medium |
| Medium | High | ⇨ | High |
| Medium | Medium | ⇨ | Medium |
| ... | ... | ⇨ | ... |

FIG. 12

| Moving body information it | | |
|---|---|---|
| Vehicle ID | Name of operator | Location (x, y) |
| t1 | A | (10, 10) |
| t2 | B | (20, 20) |
| t3 | C | (30, 30) |
| ... | ... | ... |

FIG. 13

| Notification device information ic | |
|---|---|
| Notification device ID | Location (x, y) |
| c1 | (11, 11) |
| c2 | (21, 21) |
| c3 | (31, 31) |
| ... | ... |

FIG. 14

| Correspondence among moving body, operator, and notification device | | |
|---|---|---|
| Vehicle ID | Name of operator | Notification device ID |
| t1 | A | c1, c4, c7, c10 |
| t2 | B | c2, c5, c8, c11 |
| t3 | C | c3, c6, c9, c12 |
| ... | ... | ... |

FIG. 15

| Individual control level L3 of Person A | Individual control level L3 of Person B | | Device control level L4 |
|---|---|---|---|
| High | Medium | ⇨ | High |
| Medium | High | ⇨ | High |
| Medium | Medium | ⇨ | Medium |
| ... | ... | ⇨ | ... |

FIG. 16

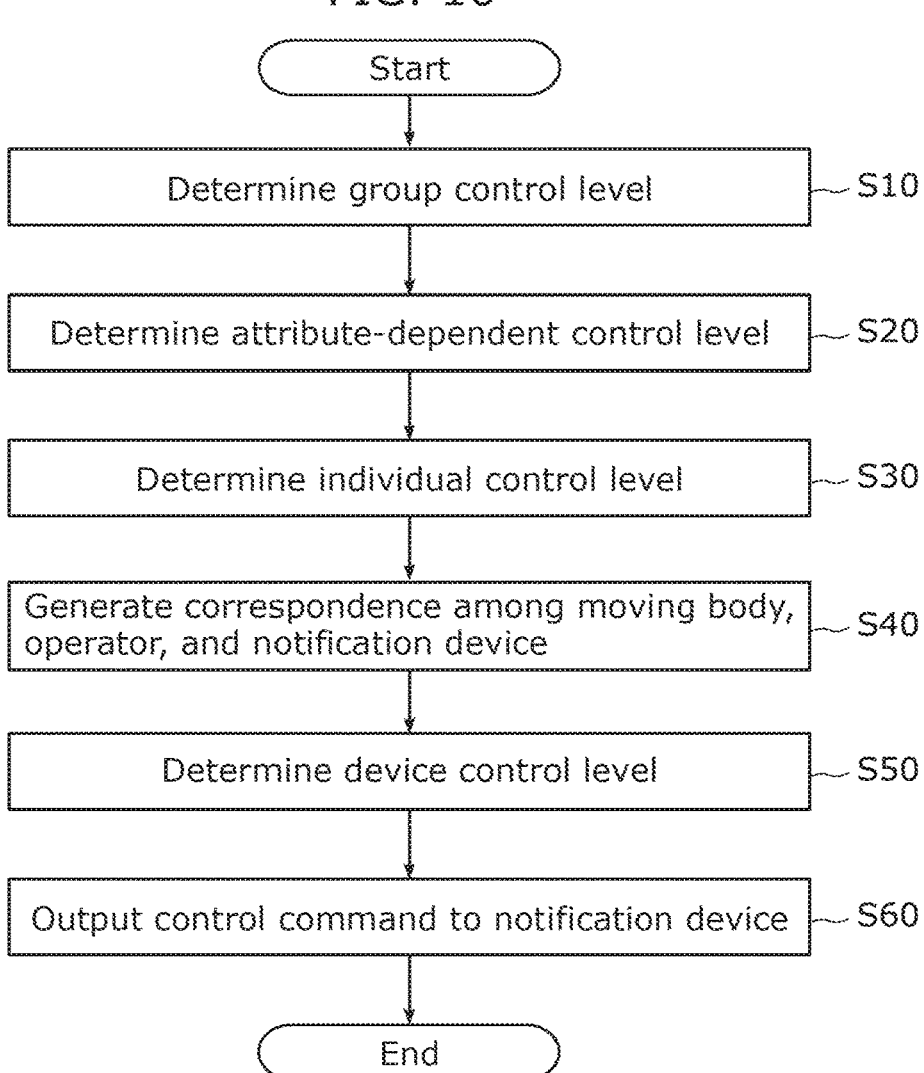

Start

Determine group control level — S10

Determine attribute-dependent control level — S20

Determine individual control level — S30

Generate correspondence among moving body, operator, and notification device — S40

Determine device control level — S50

Output control command to notification device — S60

End

FIG. 17

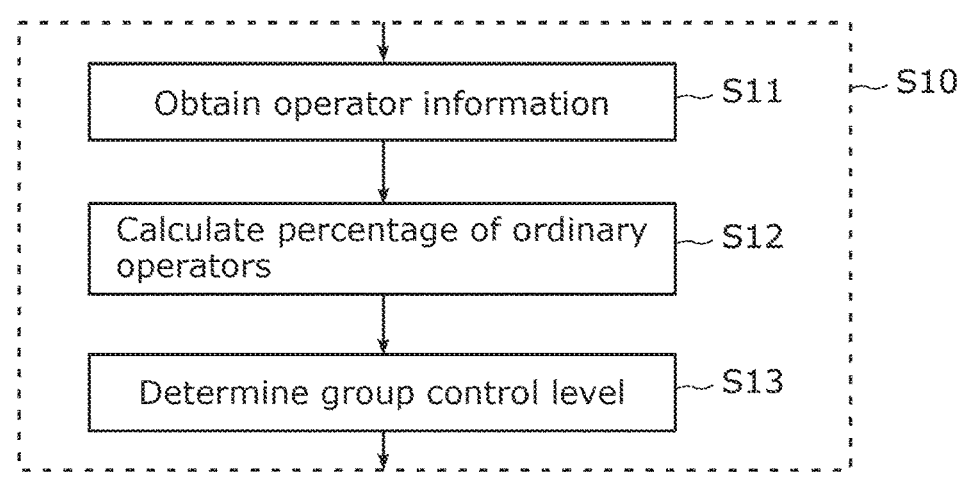

Obtain operator information — S11

Calculate percentage of ordinary operators — S12

Determine group control level — S13

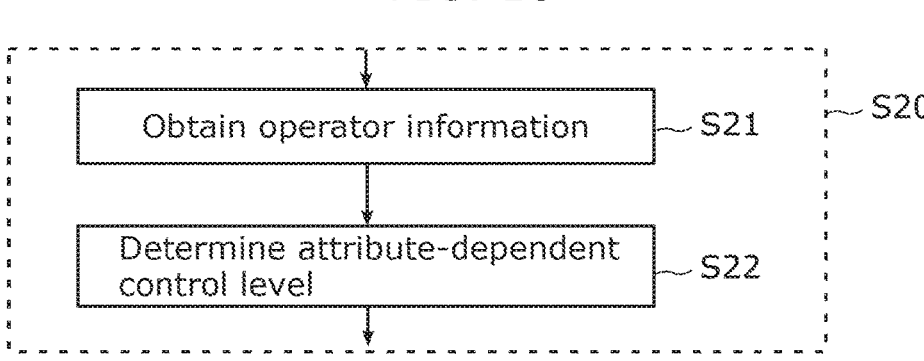

Obtain operator information — S21

Determine attribute-dependent control level — S22

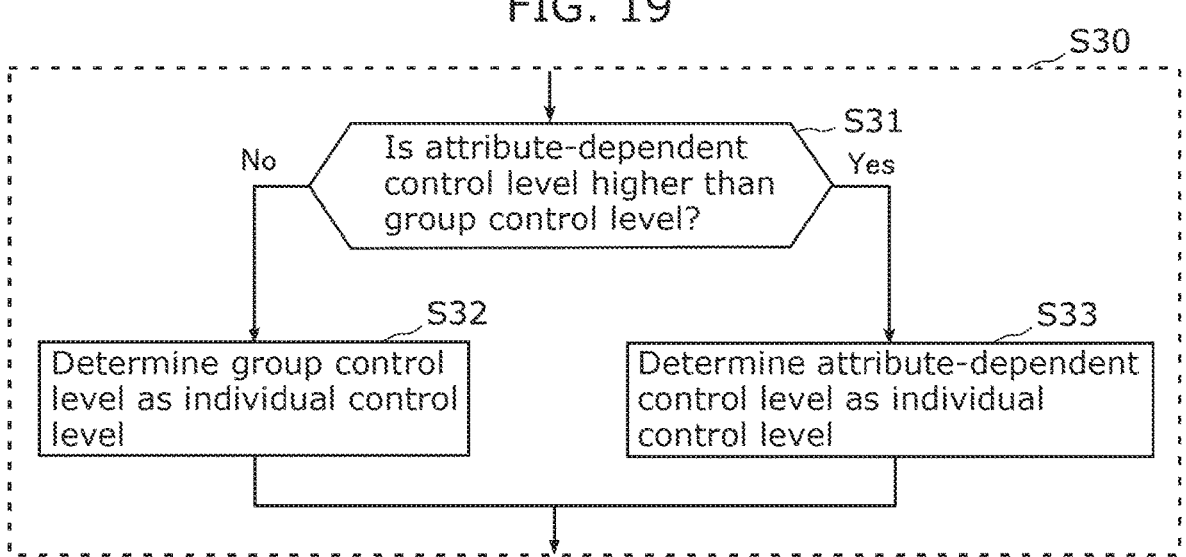

S30

Is attribute-dependent control level higher than group control level? — S31

No     Yes

Determine group control level as individual control level — S32

Determine attribute-dependent control level as individual control level — S33

FIG. 20

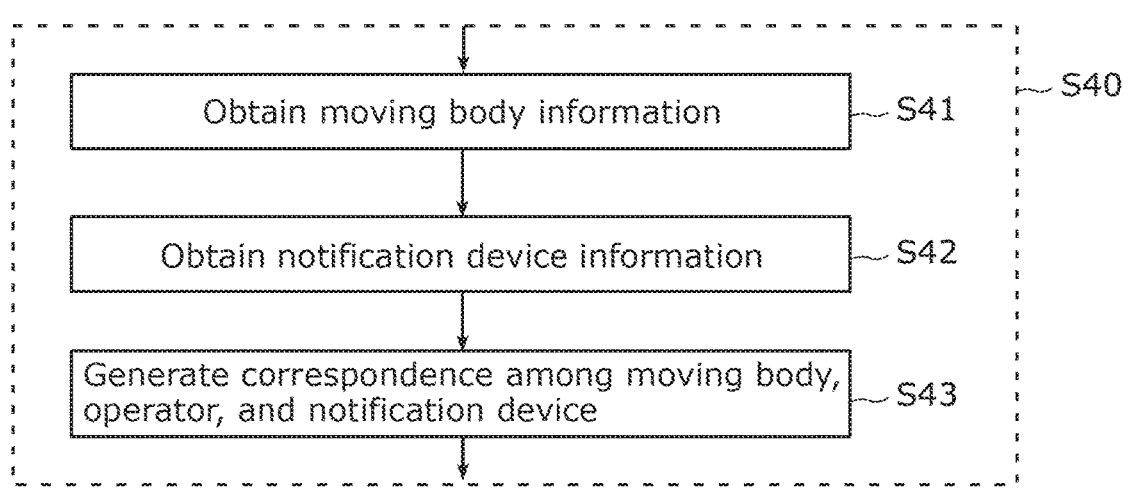

Obtain moving body information — S41

Obtain notification device information — S42

Generate correspondence among moving body, operator, and notification device — S43

S40

CONTROL METHOD AND CONTROL SYSTEM

CROSS REFERENCE TO RELATED APPLICATIONS

This is a continuation application of PCT International Application No. PCT/JP2022/007797 filed on Feb. 25, 2022, designating the United States of America, which is based on and claims priority of Japanese Patent Application No. 2021-095372 filed on Jun. 7, 2021. The entire disclosures of the above-identified applications, including the specifications, drawings and claims are incorporated herein by reference in their entirety.

FIELD

The present disclosure relates to a control method and a control system for a controlling notification device that provides traffic information.

BACKGROUND

Patent Literature (PTL) 1 discloses a traffic light control system that controls traffic lights to monitor the traffic of automobiles at intersections and to ensure the safety of pedestrians on crosswalks.

CITATION LIST

Patent Literature

PTL 1: Japanese Unexamined Patent Application Publication No. 2007-79631

SUMMARY

Technical Problem

The system disclosed in PTL 1 reads information on the pedestrians, using readers on the traffic lights and controls the traffic lights. This system may however fail to properly control notification devices, such as the traffic lights, which provide traffic information.

To address the problem, the present disclosure provides a control method and a control system that allow proper control of a notification device that provides traffic information.

Solution to Problem

A control method according to an aspect of the present disclosure is to be performed by a control device. The control method includes: determining first information indicating a group control level, based on operation skills of a plurality of operators who each perform remote monitoring or remote operation on a moving body, the group control level being required for a group of the plurality of operators to perform the remote operation, the control level indicating a degree to which a notification device assists the operator in the remote operation on the moving body, the notification device notifying people around the moving body; determining second information indicating an attribute-dependent control level, based on attribute information on the plurality of operators, and determining third information indicating individual control levels of the plurality of operators, based on the first information and the second information, the attribute-dependent control level being required for each of the plurality of operators to perform the remote operation; identifying one or more moving bodies each of which is the moving body present within a predetermined range from a predetermined notification device; determining fourth information indicating a device control level, based on the third information determined for operators of the one or more moving bodies identified, the device control level being used when controlling the predetermined notification device; and determining a detail of notification to be output from the predetermined notification device, based on the fourth information, and outputting a control command for notifying of the detail.

A control system according to an aspect of the present disclosure includes: a plurality of operation terminals that receive input operations from a plurality of operators; a plurality of notification devices, each providing traffic information on a moving body; and a server that controls the plurality of notification devices in response to the input operations. The server includes: a group level determiner that determines first information indicating a group control level, based on operation skills of the plurality of operators, the group control level being required for a group of the plurality of operators to perform the remote operation; an attribute-dependent level determiner that determines second information indicating an attribute-dependent control level, based on attribute information on the plurality of operators, the attribute-dependent control level being required for each of the plurality of operators to perform the remote operation; an individual level determiner that determines third information indicating individual control levels of the plurality of operators, based on the first information and the second information; an information obtainer that obtains moving body information on one or more moving bodies each of which is the moving body present within a predetermined range from a predetermined notification device; a device level determiner that determines fourth information indicating a device control level, based on the third information determined for operators of the one or more moving bodies identified by the moving body information, the device control level being for use in controlling the predetermined notification device; and a control command outputter that determines a detail of notification to be output from the predetermined notification device, based on the fourth information, and outputs a control command for notifying of the detail.

Advantageous Effects

The control method, for example, according to the aspect described above allows proper control of a notification device that provides traffic information.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 shows operator information obtained by the control system.

FIG. 9 shows an example correspondence between the percentage of ordinary operators and first information indicating a group control level.

FIG. 10 shows an example correspondence between attribute information on an operator and an attribute-dependent control level.

FIG. 11 shows an individual control level determined by the control system.

FIG. 12 shows moving body information obtained by the control system.

FIG. 13 shows notification device information obtained by the control system.

FIG. 14 shows a correspondence among a moving body, an operator, and a notification device, generated by the control system.

FIG. 15 shows a device control level of a notification device to be determined by the control system.

FIG. 16 is a flowchart showing a control method according to the embodiment.

FIG. 17 shows a flow in determining the first information.

FIG. 18 shows a flow in determining second information indicating the attribute-dependent control level.

FIG. 19 shows a flow in determining third information indicating the individual control level.

FIG. 20 shows a flow in generating the correspondence among a moving body, an operator, and a notification device.

DESCRIPTION OF EMBODIMENT

Figures 1, 2:
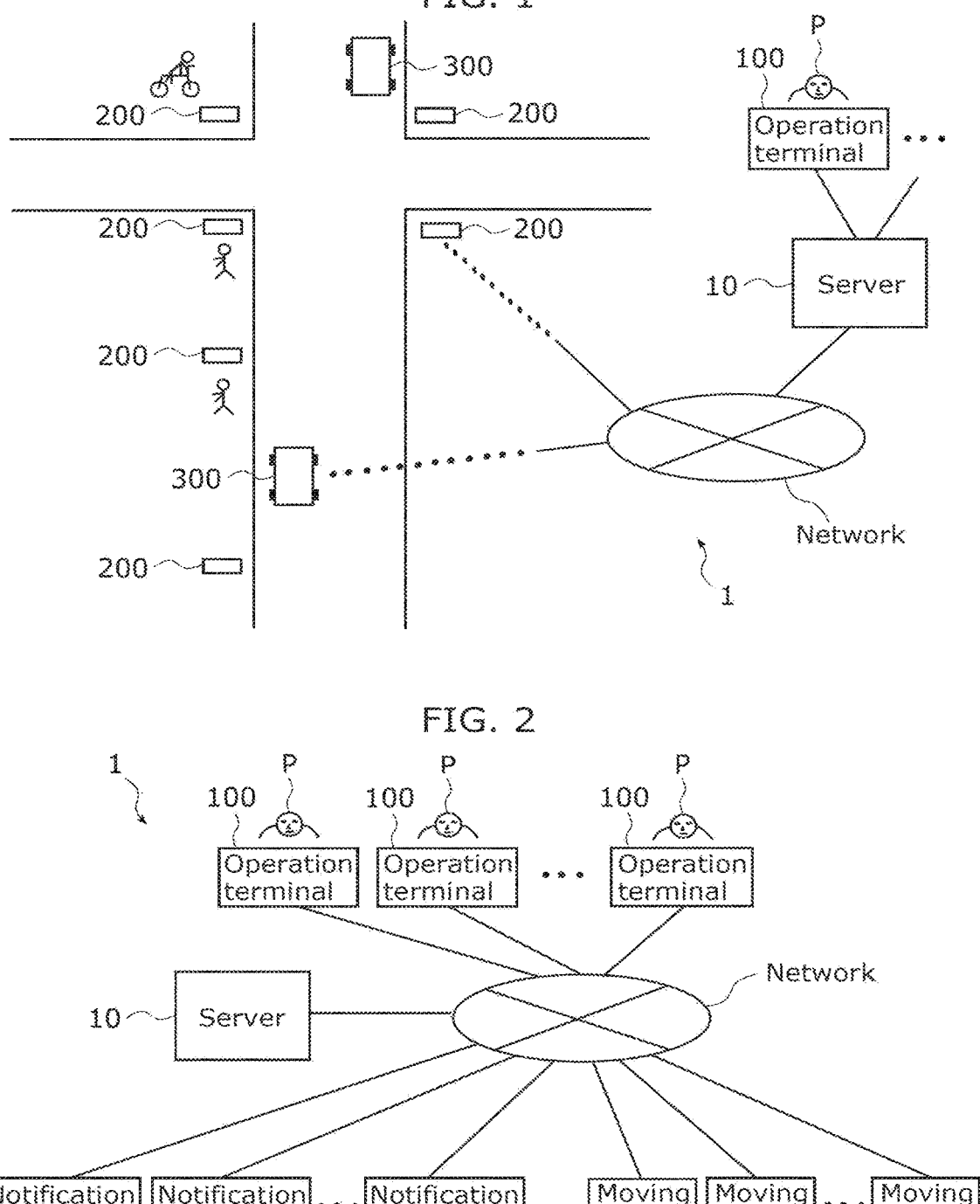
FIG. 1 is a schematic view showing an example of a control system according to an embodiment.
FIG. 2 is a block configuration diagram of the control system according to the embodiment.

As autonomous driving service, for example, an operator monitors, informs, and guides a vehicle. In this autonomous driving service, there is a need to develop the traffic infrastructure (traffic infrastructure structure) of a road, on which the vehicle travels, to ensure the safety of people near the vehicle and smooth travel of the vehicle. An example raised as the traffic infrastructure is a notification device that is placed on a road side and provides traffic information around the vehicle.

The operator controls the notification device and providing the traffic information around the vehicle, thereby ensuring the safety of the people near the vehicle and smooth travel of the vehicle. Depending on the operation skill of the operator or other factors, however, the operator may fail to provide traffic information properly using notification device. Without providing the traffic information properly, the safety of road traffic and smooth travel cannot be achieved.

By contrast, the control method according to this embodiment has the following features, thereby allowing proper control of a notification device that provides traffic information.

Specifically, a control method according to an aspect of the present disclosure is to be performed by a control device. The control method includes: determining first information indicating a group control level, based on operation skills of a plurality of operators who each perform remote monitoring or remote operation on a moving body, the group control level being required for a group of the plurality of operators to perform the remote operation, the control level indicating a degree to which a notification device assists the operator in the remote operation on the moving body, the notification device notifying people around the moving body; determining second information indicating an attribute-dependent control level, based on attribute information on the plurality of operators, and determining third information indicating individual control levels of the plurality of operators, based on the first information and the second information, the attribute-dependent control level being required for each of the plurality of operators to perform the remote operation; identifying one or more moving bodies each of which is the moving body present within a predetermined range from a predetermined notification device; determining fourth information indicating a device control level, based on the third information determined for operators of the one or more moving bodies identified, the device control level being used when controlling the predetermined notification device; and determining a detail of notification to be output from the predetermined notification device, based on the fourth information, and outputting a control command for notifying of the detail.

In this manner, the individual control level is determined based on the group control level and the attribute-dependent control level. The device control level is then determined based on the individual control level and the information on the notification. This allows proper control of the notification device that provides traffic information.

The third information may be determined to be a higher one of the group control level according to the first information and the attribute-dependent control level according to the second information.

This ensures the safety of road traffic and allows proper control of the notification device that provides the traffic information.

The fourth information may be determined to be a highest one of control levels according to the third information determined for the plurality of operators who perform the remote operation on a plurality of moving bodies, when the plurality of moving bodies are present around the notification device.

This ensures the safety of road traffic and allows proper control of the notification device that provides the traffic information.

The operation skills of the plurality of operators the operation skills of the plurality of operators who each perform the remote operation on the moving body may depend on proficiency levels of the plurality of operators.

This allows proper determination on the group control level based on the operation skills of the operators. Accordingly, the individual control levels are properly determined. Based on the group control level and the attribute-dependent control level, the device control level is properly determined. This allows proper control of the notification device that provides the traffic information.

The group control level may be determined based on a percentage of ordinary operators who are less-skilled among all of the plurality of operators in the group.

This allows proper determination on the group control level based on the percentage of the ordinary operators. Accordingly, the individual control level is properly determined based on the group control level and the attribute-dependent control level. In addition, the device control level is properly determined. This allows proper control of the notification device that provides the traffic information.

The attribute information may include information on at least one of a certification held by the operator, an achievement of the operator, or an amount of work in progress, or a detail of work in progress.

This allows proper determination on the attribute-dependent control level by the attribute information. Accordingly, the individual control level is properly determined based on the group control level and the attribute-dependent control level. In addition, the device control level is properly determined. This allows proper control of the notification device that provides the traffic information.

The notification device may be placed in a movable range of the moving body.

This allows proper control of the plurality of notification devices that provide traffic information.

The notification device may include a plurality of notification devices at least one of which is mounted on the moving body.

This allow proper control of the notification device on the moving body.

The moving body may be an autonomous driving vehicle.

This allows proper control of the notification device that provides information on the autonomous driving vehicle.

A control system according to an aspect of the present disclosure includes: a plurality of operation terminals that receive input operations from a plurality of operators; a plurality of notification devices, each providing traffic information on a moving body; and a server that controls the plurality of notification devices in response to the input operations. The server includes: a group level determiner that determines first information indicating a group control level, based on operation skills of the plurality of operators, the group control level being required for a group of the plurality of operators to perform the remote operation; an attribute-dependent level determiner that determines second information indicating an attribute-dependent control level, based on attribute information on the plurality of operators, the attribute-dependent control level being required for each of the plurality of operators to perform the remote operation; an individual level determiner that determines third information indicating individual control levels of the plurality of operators, based on the first information and the second information; an information obtainer that obtains moving body information on one or more moving bodies each of which is the moving body present within a predetermined range from a predetermined notification device; a device level determiner that determines fourth information indicating a device control level, based on the third information determined for operators of the one or more moving bodies identified by the moving body information, the device control level being for use in controlling the predetermined notification device; and a control command outputter that determines a detail of notification to be output from the predetermined notification device, based on the fourth information, and outputs a control command for notifying of the detail.

This control system determines the individual control level, based on the group control level and the attribute-dependent control level. This control system then determines the device control level of the notification device, based on the individual control level and the information on the notification device. This allows proper control of the notification device that provides traffic information.

Note that these general and specific aspects of the present disclosure may be implemented using a system, a method, an integrated circuit, a computer program, or a computer-readable recording medium such as a CD-ROM, or any combination of systems, methods, integrated circuits, computer programs, or recording media.

Now, a control method and a control system according to an aspect of the present disclosure will be described in detail with reference to the drawings.

The embodiment described below is a mere specific example of the present disclosure. The numerical values, shapes, materials, elements, the arrangement and connection of the elements, steps, step orders etc. shown in the following embodiment are thus mere examples, and are not intended to limit the scope of the present disclosure. Among the elements described in the following embodiment, those not recited in the independent claims which embody the broadest concept of the present disclosure will be described as optional.

Embodiment

[Overall Configuration of Control System]

An overall configuration of the control system according to the embodiment will be described with reference to FIGS. 1 and 2.

FIG. 1 is a schematic view showing an example of control system 1 according to the embodiment. FIG. 2 is a block configuration diagram of control system 1 according to the embodiment.

As shown in FIGS. 1 and 2, control system 1 includes a plurality of operation terminals 100, server 10, and a plurality of notification devices 200. Control system 1 may include a plurality of moving bodies 300 on a road.

Operation terminals 100 are communicatively connected to server 10 via a network, such as the Internet. Notification devices 200 and moving bodies 300 are communicatively connected to server 10 via a network. That is, server 10 is communicatively connected to operation terminals 100, notification devices 200, and moving bodies 300 via the network.

Moving bodies 300 are vehicles to be monitored by control system 1 and are, for example, autonomous driving vehicles. Moving bodies 300 include a global positioning system (GPS) and can transmit own location information to server 10.

Operation terminals 100 are terminal devices that receive input operations for remotely operating notification devices 200 and moving bodies 300. Operation terminals 100 receive input operations from a plurality of operators P and output the received input operations to server 10.

Server 10 is a control device that remotely operates the plurality of moving bodies 300 in response to the input operations received at the plurality of operation terminals 100. Server 10 performs various calculation processing in response to the input operations, and outputs, to moving bodies 300, control commands according to the calculation processing. Server 10 also outputs control commands for controlling notification devices 200 to notification devices 200.

Notification devices 200 provide traffic information around moving bodies 300 to people around notification devices 200. The traffic information around moving bodies 300 is necessary, for example, to ensure the safety of the people near moving bodies 300 and smooth travel of moving bodies 300. The "people around notification devices 200" are, for example, those who within a distance of 10 m from notification devices 200, including people walking on a street, waiting at a traffic right, and riding a bicycle. Notification devices 200 provide the traffic information, based on the control commands output from server 10.

In this manner, control system 1 provides traffic information around moving bodies 300 to people near moving bodies 300, using notification devices 200 in order to ensure the safety of the people near moving bodies 300 and smooth travel of moving bodies 300. Now, configurations of operation terminals 100, server 10, and notification devices 200 included in control system 1 will be described.

[Notification Device]

Figure 3:
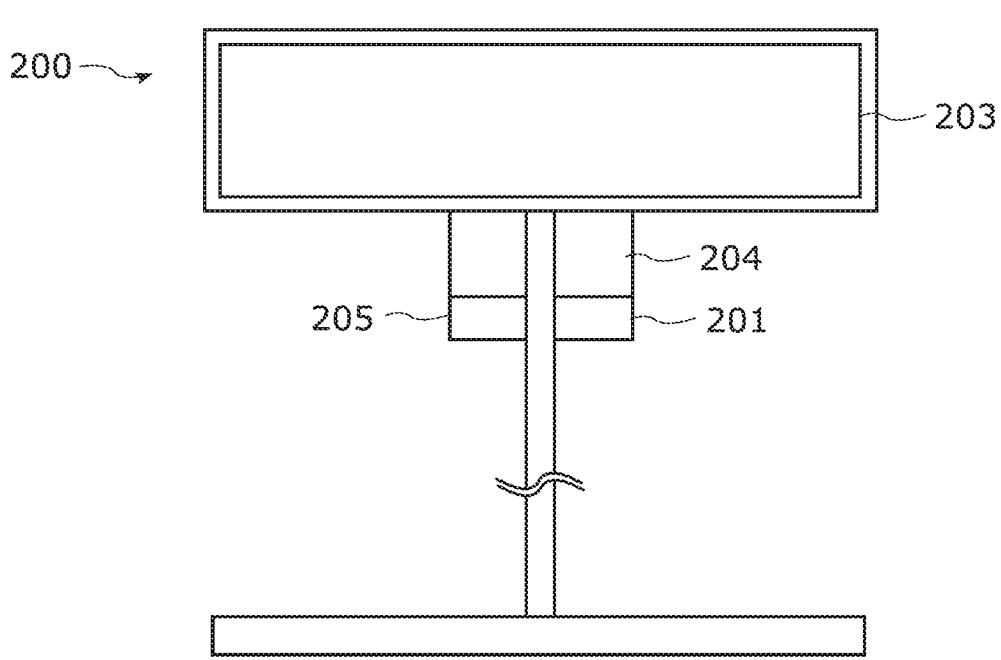
FIG. 3 is a schematic view of a notification device included in the control system according to the embodiment.
Figure 4:
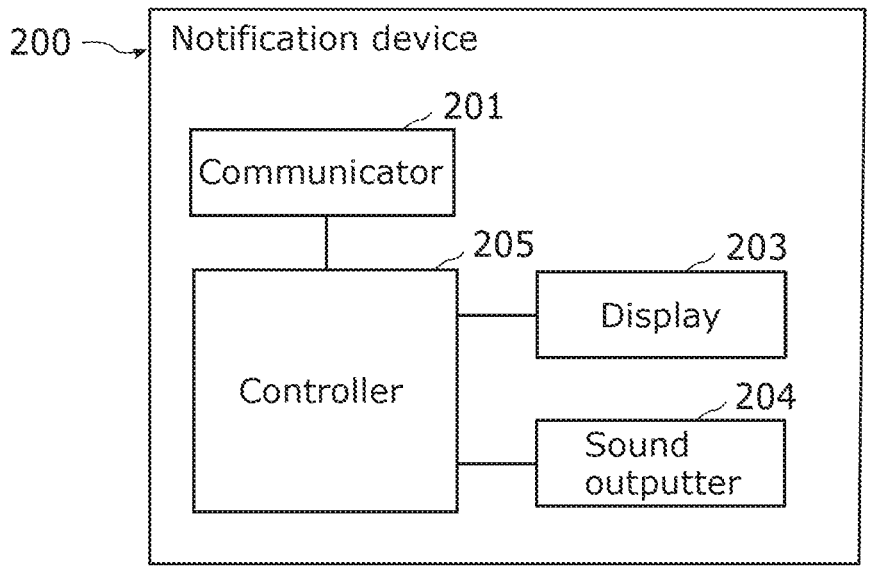
FIG. 4 is a block configuration diagram of the notification device.

FIG. 3 is a schematic view of each notification device 200 included in control system 1. FIG. 4 is a block configuration diagram of each notification device 200 included in control system 1.

Notification devices 200 are arranged in areas, such as intersections or road sides, through which moving bodies 300 travel (see FIG. 1). For example, notification devices 200 are arranged at a predetermined interval (e.g., from 10 m to 50 m) at corners of intersections or along roads. Note that notification devices 200 may be adjacent to road signs.

As shown in FIGS. 3 and 4, each notification device 200 includes communicator 201, display 203, sound outputter 204, and controller 205. Communicator 201, display 203, and sound outputter 204 are connected to controller 205.

Communicator 201 is a communication module that communicates with server 10 via a network. Display 203 is, for example, a visual display that displays traffic information around moving body 300 by letters, characters, figures, or any other suitable means. Display 203 is placed at a height of 1 m to 2 m from the ground, for example. Sound outputter 204 is, for example, a speaker that provides traffic information around moving body 300 by sound. Controller 205 controls the operations of communicator 201, display 203, and sound outputter 204. Controller 205 includes a microprocessor, a memory, and programs stored in the memory, for example. Controller 205 may have a GPS function.

Control system 1 sets control levels for the plurality of notification devices 200. The control levels are each information set for determining the details or method of notification from associated notification device 200. This control level depends on the operation skill of operator P of each moving body 300 or the amount of work in progress, and is one of three stages of "low", "medium", and "high", for example.

In control system 1 according to this embodiment, the details of notification by notification devices 200 according to traffic information depend on the control levels set for notification devices 200.

Figure 5:
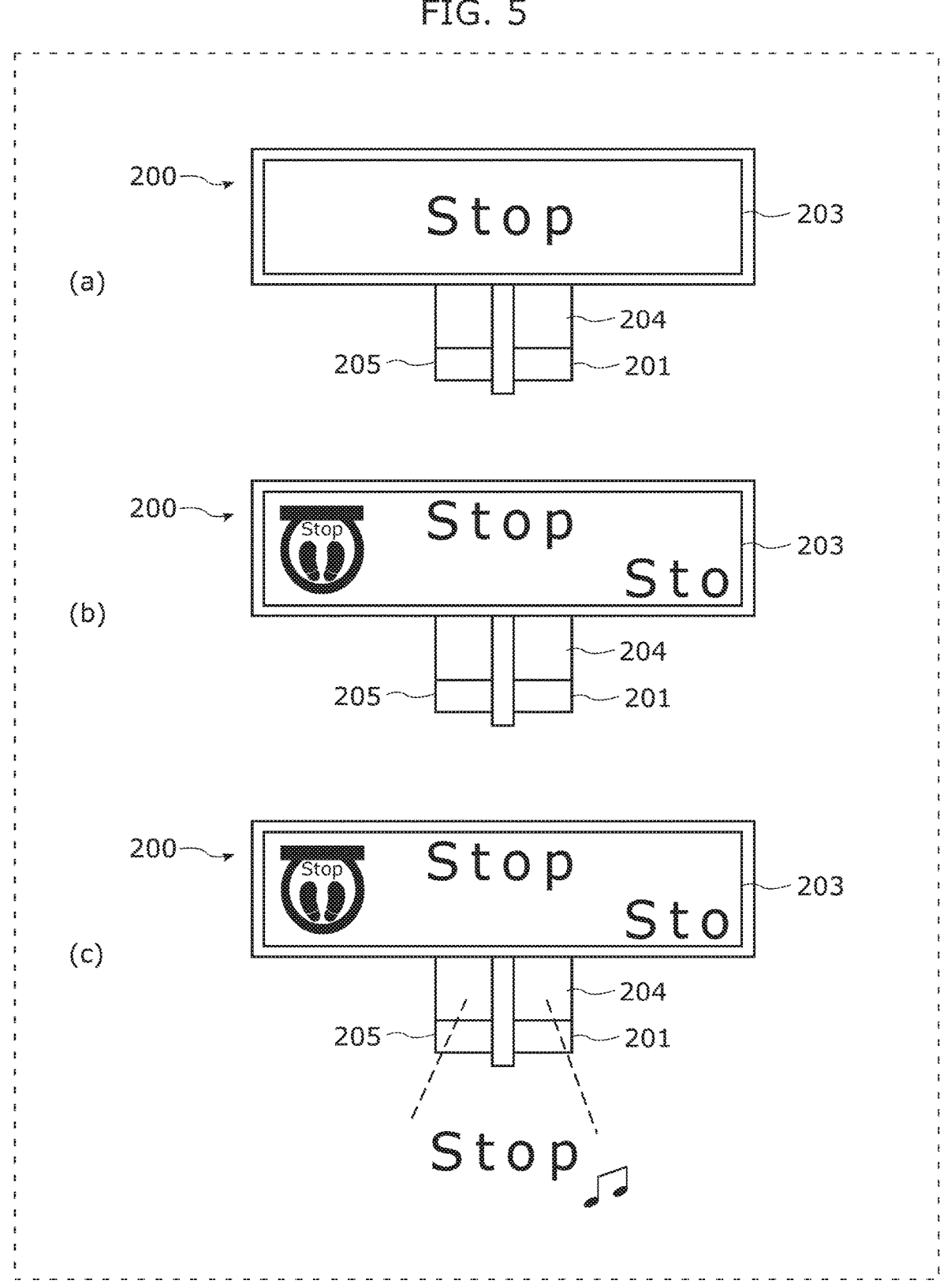
FIG. 5 shows example details of traffic information provided by the notification device.

FIG. 5 shows example details of notification by notification device 200 according to traffic information.

For example, assume that operator P who remotely operates moving body 300 has a high operation skill. In this case, there is a lower need for notification device 200 to call attention to the surrounding people or other moving bodies in order to ensure the safety. That is, there is a lower need for control system 1 to assist operator P in the remote operation on moving body 300, using notification device 200. In this case, control system 1 sets the device control level for notification device 200 to "low" and determines the details and method of notification by notification device 200 not to call excessive attention to the surrounding people or other moving bodies. Assume that an autonomous driving vehicle is approaching and there is a need to call attention to the surrounding people. In this case, control system 1 statically displays letters "Stop" only on display 203 without using sound outputter 204, as shown in (a) of FIG. 5, for example.

For example, assume that operator P has a medium operation skill (i.e., between the high operation skill described above and the low operation skill which will be described later). Relative to operator P with a high operation skill, there is a high need for notification device 200 call attention to the surrounding people or other moving bodies in order to ensure the safety. That is, there is a higher need than in the case of the high operation skill described above, for control system 1 to assist operator P in the remote operation on moving body 300, using notification device 200. In this case, control system 1 sets the device control level to "medium" and determines the details and method of notification by notification device 200 to call proper attention to the surrounding people or other moving bodies. Assume that an autonomous driving vehicle is approaching and there is a need to call attention the surrounding people. In this case, control system 1 dynamically displays letters "Stop" and a pictograph indicating the approach of the autonomous driving vehicle on display 203, as shown in (b) of FIG. 5, for example.

For example, assume that operator P has a low operation skill. In this case, there is a higher need than in the case of the medium operation skill described above, for notification device 200 to call attention to the surrounding people or other moving bodies in order to ensure the safety. That is, there is a higher need than in the case of the medium operation skill described above, for control system 1 to assist operator P in the remote operation on moving body 300, using notification device 200. In this case, control system 1 sets the device control level to "high" and determines the details and method of notification by notification device 200 to call sufficient attention to the surrounding people or other moving bodies. Assume that an autonomous driving vehicle is approaching and there is a need to call attention the surrounding people. In this case, control system 1 dynamically displays letters "Stop" and a pictograph indicating the approach of the autonomous driving vehicle on display 203, and outputs voice of "Stop" from sound outputter 204, as shown in (c) of FIG. 5, for example.

In this manner, the level of notification device 200 in assisting operator P in the remote operation on moving body 300 depends on the operation skill or other characteristics of operator P of moving body 300. Specifically, the details of notification by notification device 200 depends on the operation skill of operator P to differ the degree of attention to be called to the surrounding people or other moving bodies. This ensures the safety and smoothness of traffic.

Now, a specific configuration to determine the device control level will be described.

[Operation Terminal]

Figure 6:
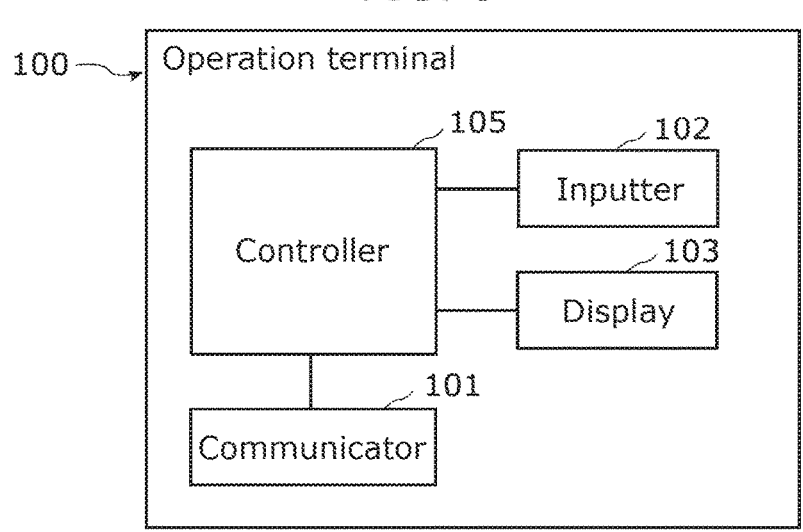
FIG. 6 is a block configuration diagram of an operation terminal included in the control system according to the embodiment.

FIG. 6 is a block configuration diagram of each operation terminal 100 included in control system 1.

Each operation terminal 100 is a device, such as a personal computer (PC), including communicator 101, inputter 102, display 103, and controller 105. Communicator 101, inputter 102, and display 103 are connected to controller 105.

Communicator 101 is a communication module that communicates with server 10 via a network. Inputter 102 is a user interface that receives an input operation from operator P. Display 103 is a screen, for example. Display 103 displays a map of a movable area of moving body 300, the location of moving body 300 on the map, the possible route of moving body 300, or other information in order to monitor or remotely operate moving body 300. Controller 105 controls the operations of communicator 101, inputter 102, and display 103. Controller 105 includes a microprocessor, a memory, and programs stored in the memory, for example.

Each operation terminal 100 receives operator information ip on operator P through inputter 102. Operator information ip includes the name of operator P, the identification (ID), the operation skill of operator P, and the attribute information on operator P, for example. Input operator information ip is output to server 10.

[Server]

Server 10 is located in a place different from the locations of notification devices 200 and, for example, inside a structure, such as building. Server 10 may be located in the same place as operation terminals 100.

Figure 7:
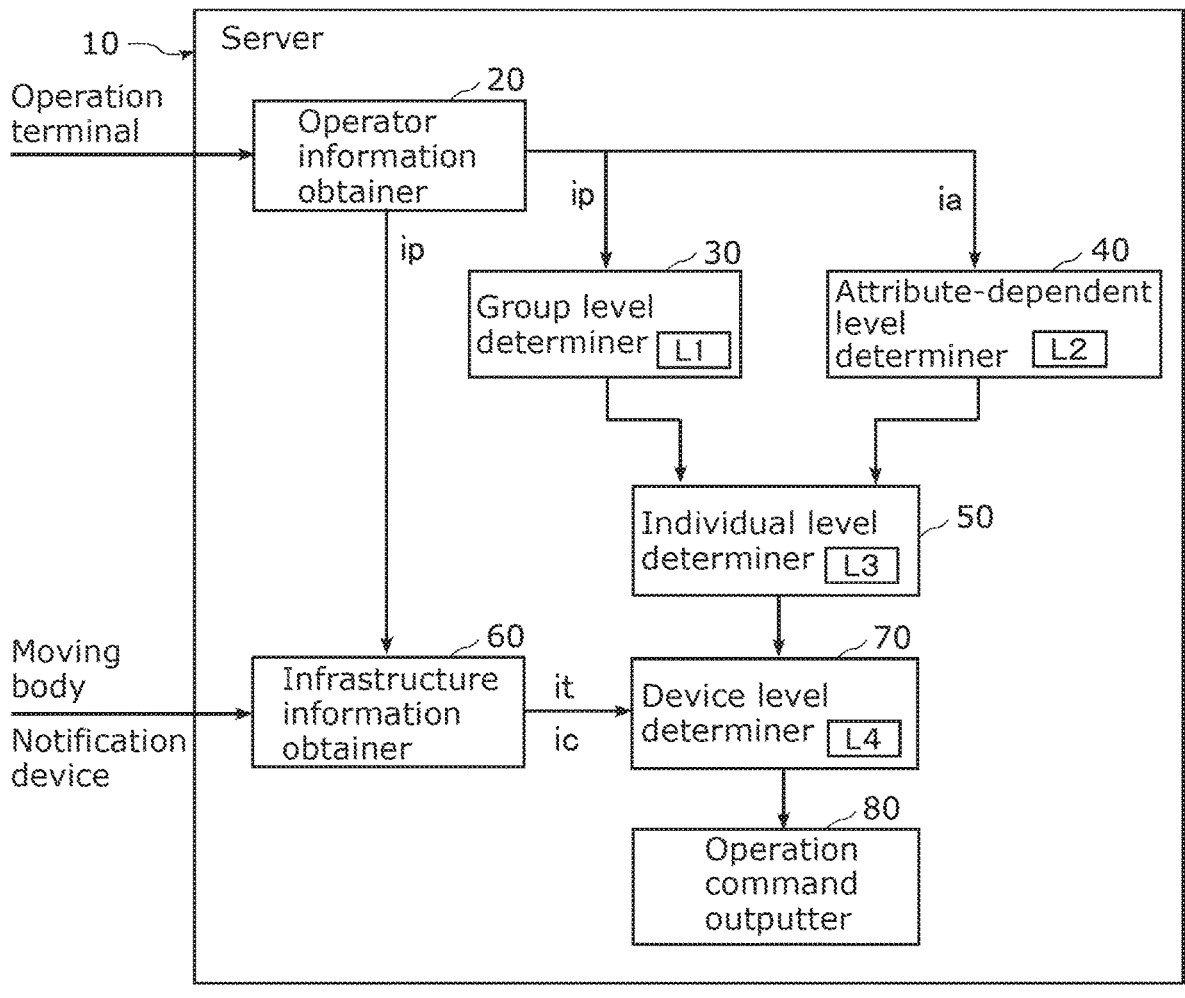
FIG. 7 is a block configuration diagram of a server included in the control system according to the embodiment.

FIG. 7 is a block configuration diagram of server 10 included in control system 1.

As shown in FIG. 7, server 10 includes group level determiner 30, attribute-dependent level determiner 40, individual level determiner 50, device level determiner 70, and control command outputter 80. Server 10 also includes operator information obtainer 20 and infrastructure information obtainer 60.

Server 10 includes a communication module, a microprocessor, a memory, and programs stored in the memory, for example. The memory stores information on notification devices 200 and moving bodies 300. The functional configurations of the level determiners and the information obtainers described above are fulfilled by executing the programs stored in the memory.

Operator information obtainer 20 shown in FIG. 7 obtains, from operation terminal 100, operator information ip on operator P of remote operation.

FIG. 8 shows operator information ip obtained in control system 1.

As shown in FIG. 8, operator information ip includes the name of operator P, the ID, the operation skill of operator P, attribute information is on operator P, and the state of operator P.

The operation skill of operator P depends of the proficiency level of operator P who remotely operates moving body 300. For example, with an experience of four years or more as operator P, the operator is regarded as "skilled operator P1". With an experience less than four years as operator P, the operator is regarded as "ordinary operator P2". Attribute information is on operator P is, for example, the information on the certifications and achievement of operator P, and the amount and details of the work in progress.

Operator information obtainer 20 also grasps whether operator P is active or inactive. When being "active", operator P can monitor or remotely operate moving body 300, using operation terminal 100. Otherwise, operator P is "inactive". Operator P is "inactive", while not logged in control system 1 or taking a rest.

The information on operator P obtained by operator information obtainer 20 is used in group level determiner 30, attribute-dependent level determiner 40, individual level determiner 50, infrastructure information obtainer 60, and device level determiner 70, which will be described later.

Group level determiner 30 shown in FIG. 7 determines first information indicating group control level L1, based on the operation skills of a plurality of operators P. Group control level L1 is required for a group of the plurality of operators P who operate remote operation. Group control level L1 corresponds to the control level as a reference of the whole group (i.e., the degree of notification device 200 in assisting operator P in the remote operation on moving body 300). Same group control level L1 is set for the plurality of operators P.

For example, group level determiner 30 determines group control level L1 by calculating the percentage of less-skilled ordinary operators P2 among all operators P in the group. The "group" here includes all operators P active for control system 1. The percentage of ordinary operators P2 is calculated using the number of all active operators P as a denominator and the number of ordinary operators P2 as a numerator.

FIG. 9 shows an example correspondence between the percentage of ordinary operators P2 and group control level L1. Group control level L1 shown in FIG. 9 is divided into three stages of "low", "medium", and "high".

For example, if the percentage of ordinary operators P2 in a predetermined group is less than 40%, skilled operators P1 at a higher percentage are believed to perform remote operation properly. Group level determiner 30 thus determines group control level L1 of the predetermined group to be "low". For example, if the percentage of ordinary operators P2 is 40% or more and less than 60%, skilled operators P1 and ordinary operator P2 are believed to perform remote operation without any problem. Group level determiner 30 thus determines group control level L1 of the predetermined group to be "medium". For example, if the percentage of ordinary operators P2 of a predetermined group is more than 60%, remote operation may be performed improperly. Group level determiner 30 thus determines group control level L1 of the predetermined group to be "high".

Group control level L1 determined by group level determiner 30 will be used to determine individual control level L3, which will be described later.

Attribute-dependent level determiner 40 shown in FIG. 7 determines second information indicating attribute-dependent control level L2, based on attribute information ia on the plurality of operators P. Attribute-dependent control level L2 is required for the plurality of operators P who perform remote operation.

Attribute-dependent control level L2 is set depending on the operation skill of each operator. In this embodiment, each attribute is in advance associated with attribute-dependent control level L2. Attribute-dependent level determiner 40 determines attribute-dependent control level L2 of operator P, based on attribute-dependent control level L2 associated in advance.

FIG. 10 shows an example correspondence between attribute information ia on operator P and attribute-dependent control level L2. Attribute-dependent control level L2 shown in FIG. 10 is divided into three stages of "low", "medium", and "high".

For example, operator P holding Grade 1 of a remote operator's certificate is believed to perform remote operation properly. Attribute-dependent level determiner 40 thus determines attribute-dependent control level L2 of this operator P to be "low". For example, operator P holding Grade 2 of the remote operator's certificate is believed to perform remote operation without any problem. Attribute-dependent level determiner 40 thus determines attribute-dependent control level L2 of this operator P to be "medium". For example, operator P holding Grade 3 of the remote operator's certificate may perform remote operation improperly. Attribute-dependent level determiner 40 thus determines attribute-dependent control level L2 of this operator P to be "high".

Note that attribute-dependent level determiner 40 may determine attribute-dependent control level L2, based on the amount of work in progress by operator P. For example, with a large amount of work in progress, operator P fails to pay attention to the things other than the work. In this case, attribute-dependent level determiner 40 may determine attribute-dependent control level L2 of operator P with a large amount of work in progress to be "high" in order to ensure the safety of the people near moving body 300 monitored by operator P.

Attribute-dependent level determiner 40 may determine attribute-dependent control level L2 based on the details of the work in progress by operator P. For example, while a higher percentage of operators handle complaints, mutual follow-up among the plurality of operators P becomes difficult. In this case, attribute-dependent level determiner 40 may determine attribute-dependent control level L2 of operator P who is handling a complaint to be "high" in order to ensure the safety of the people near moving body 300 monitored by operator P.

Attribute-dependent control level L2 determined by attribute-dependent level determiner 40 will be used to determine individual control level L3, which will be described later.

Individual level determiner 50 shown in FIG. 7 determines third information indicating individual control level L3 of each of the plurality of operators P, based on group control level L1 and attribute-dependent control level L2. In this embodiment, individual level determiner 50 determines, as individual control level L3 (according to the third information), the higher one of group control level L1 (according to the first information) and attribute-dependent control level L2 (according to the second information). That is, the higher one of group control level L1 as a reference of the whole group and attribute-dependent control level L2 depending on the operation skill of operator P (i.e., a higher degree of assistance by notification device 200) is determined as individual control level L3 (i.e., the degree of assistance by notification device 200) of operator P.

FIG. 11 shows individual control level L3 determined by control system 1. Individual control level L3 shown in FIG. 11 is also divided into three stages of "low", "medium", and "high".

For example, if group control level L1 is "medium" and attribute-dependent control level L2 is "low", individual level determiner 50 determines individual control level L3 to be "medium". For example, if group control level L1 is "medium" and attribute-dependent control level L2 is "high", individual level determiner 50 determines individual control level L3 to be "high". For example, if group control level L1 is "medium" and attribute-dependent control level L2 is "medium", individual level determiner 50 determines individual control level L3 to be "medium". In this manner, individual level determiner 50 selects and determines the higher one of the control levels in order to ensure the safety of road traffic.

Infrastructure information obtainer 60 shown in FIG. 7 obtains information on notification devices 200 within a predetermined distance from moving bodies 300 monitored or remotely operated by the plurality of operators P.

FIG. 12 shows moving body information it obtained by control system 1. FIG. 13 shows notification device information is obtained by control system 1.

Infrastructure information obtainer 60 obtains moving body information it on the locations of moving bodies 300, based on signals transmitted from moving bodies 300. As shown in FIG. 12, moving body information it includes the vehicle IDs, the names of operators P monitoring the vehicles, the location information (x, y) on the vehicles. The location information on each vehicle may be represented by a distance from reference coordinates or by the longitude and latitude.

Infrastructure information obtainer 60 also obtains notification device information ic on notification devices 200, based on information stored in a memory or signals transmitted from notification devices 200. As shown in FIG. 13, notification device information ic includes the IDs of notification devices 200 and location information (x, y) on notification devices 200. The location information on each notification device 200 may be represented by a distance from reference coordinates or by the longitude and latitude.

Infrastructure information obtainer 60 generates the correspondence among moving body 300, operator P, and notification device 200, based on these moving body information it and notification device information ic.

FIG. 14 shows the correspondence among moving body 300, operator P, and notification device 200, generated by control system 1. Listed up here are the ID information on notification devices 200 within a predetermined distance from moving body 300 monitored or remotely operated by operator P. The "predetermined distance" ranges from 0 m to 50 m, for example. Shown for person A in FIG. 14 are, for example, ID information c1, c4, c7, and c10 on the notification devices near vehicle t1 monitored by person A.

From this list, server 10 grasps the ID information on notification devices 200 near moving body 300 and operators P controlling notification devices 200. In addition, server 10 identifies one or more moving bodies 300 present within predetermined range from predetermined notification device 200. Server 10 sets device control level L4 of each notification device 200, based on this FIG. 14.

Device level determiner 70 shown in FIG. 7 determines fourth information indicating device control level L4 of each notification device 200, based on individual control level L3 and the information on notification device 200. Device control level L4 is used in controlling notification device 200 and is determined based on individual control level L3 of operator P who remotely operates a moving body present within a predetermined range from a certain notification device. For example, assume that device level determiner 70 refers to the information shown in FIG. 14 and there a plurality of moving bodies 300 associated with one notification device 200. In this case, device level determiner 70 determines, as device control level L4 (i.e., fourth information), the highest one of individual control levels L3 (i.e., the third information) of the plurality of operators P who remotely operate the plurality of moving bodies 300. That is, in this example, assume that a plurality of moving bodies are present in a predetermined range from certain notification device 200. In this case, determined for this notification device 200 is the control level of operator P requiring the most assistance from notification devices 200 among the plurality of operators P who remotely operate the plurality of moving bodies.

FIG. 15 shows device control level L4 determined by control system 1. Device control level L4 shown in FIG. 15 is also divided into three stages of "low", "medium", and "high". FIG. 15 shows that there are two operators who control notification devices 200.

For example, if individual control level L3 of person A is "high" and individual control level L3 of person B is "medium", device level determiner 70 determines device control level L4 to be "high". For example, if individual control level L3 of person A is "medium" and individual control level L3 of person B is "high", device level determiner 70 determines device control level L4 to be "high".

For example, if individual control level L3 of person A is "medium" and individual control level L3 of person B is "medium", device level determiner 70 determines device control level L4 to be "medium".

The location of each moving body 300 changes every moment and notification devices 200 near moving body 300 change every moment. Accordingly, each device control level L4 is determined to change every moment.

Control command outputter 80 shown in FIG. 7 determines the details of notification to each notification device 200 in accordance with device control level L4. Control command outputter 80 then outputs a control command for the notification by notification device 200, based on the determined details of notification. The details of notification to notification device 200 are as illustrated in FIG. 5.

In this manner, control system 1 according to this embodiment determines group control level L1 based on the operation skills of the plurality of operators P. Control system 1 determines attribute-dependent control level L2 based on attribute information is on the plurality of operators P. Control system 1 determines individual control level L3 based on group control level L1 and attribute-dependent control level L2. Control system 1 then determines device control level L4 based on individual control level L3 and the information on notification device 200. In this manner, control system 1 determines device control level L4, thereby allowing proper control of notification device 200 that provides traffic information.

[Control Method]

A control method according to the embodiment will be described with reference to FIGS. 16 to 20.

FIG. 16 is a flowchart showing the control method according to the embodiment.

As shown in FIG. 16, the control method according to the embodiment includes: step S10 of determining first information indicating group control level L1; step S20 of determining second information indicating attribute-dependent control level L2; step S30 of determining on third information indicating individual control level L3; step S40 of generating the correspondence among moving body 300, operator P, and notification device 200; step S50 of determining fourth information indicating device control level L4 on each notification device 200. The control method also includes step S60 of outputting control commands to notification devices 200. Now, the respective processing will be described.

FIG. 17 shows a flow in step S10 of determining the first information indicating group control level L1.

First, server 10 obtains operator information ip from each operation terminal 100 (step S11).

Next, server 10 calculates the percentage of less-skilled ordinary operators P2 among all operators P of a group (step S12). The percentage of ordinary operators P2 is calculated using the number of all active operators P as a denominator and the number of ordinary operators P2 as a numerator.

Server 10 then determines the first information indicating group control level L1 (step S13). For example, server 10 determines group control level L1 based on the percentage of ordinary operators P2 calculated in step S12 and the correspondence shown in FIG. 9. Note that FIG. 9 is a mere example.

FIG. 18 shows a flow in step S20 of determining attribute-dependent control level L2.

Server 10 obtains operator information ip from each operation terminal 100 (step S21). If operator information ip necessary for step S20 has been obtained in step S11, this step S21 may be omitted.

Next server 10 determines attribute-dependent control level L2 based on operator information ip and the correspondence shown in FIG. 10 (step S22). Note that FIG. 10 is a mere example.

Note that this step S20 may be executed before step S10.

FIG. 19 shows a flow in step S30 of determining individual control level L3.

Server 10 compares group control level L1 to attribute-dependent control level L2. Specifically, server 10 determines whether attribute-dependent control level L2 is higher than group control level L1 (step S31).

Upon determination that attribute-dependent control level L2 is lower (No in S31), server 10 determines group control level L1 as individual control level L3 (step S32). Upon determination that attribute-dependent control level L2 is higher (Yes in S31), server 10 determines attribute-dependent control level L2 as individual control level L3 (step S33).

By executing these steps S31 to S33 on each operator P, server 10 determines individual control level L3 of operator P.

FIG. 20 shows a flow of step S40 of generating the correspondence among moving body 300, operator P, and notification device 200.

Server 10 obtains moving body information it (step S41) and obtains notification device information ic (step S42). Note that step S42 may be executed before step S41.

Next, server 10 generates the correspondence among moving body 300, operator P, and notification device 200 as shown in FIG. 14, based on moving body information it and notification device information ic (step 43). In addition, server 10 identifies one or more moving bodies 300 within a predetermined range from predetermined notification device 200.

Figure 21:
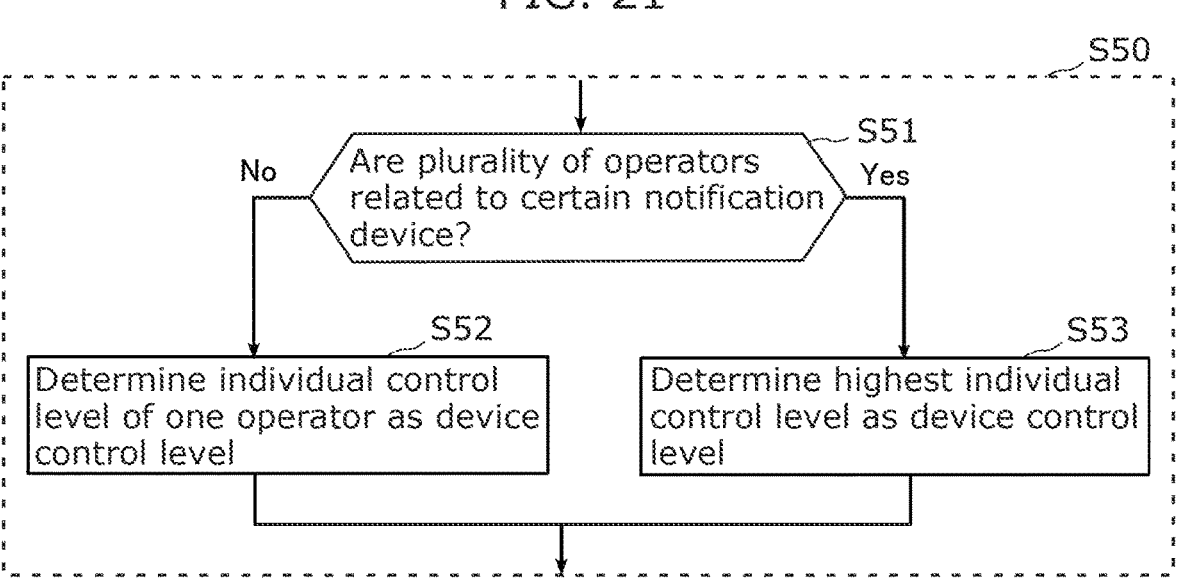
FIG. 21 shows a flow in determining the device control level of a notification device.

FIG. 21 shows a flow of S50 of determining device control level L4 of each notification device 200.

First, server 10 determines whether a plurality of operators P are related to predetermined notification device 200 (step S51).

Upon determination that only one operator P is related (No in S51), server 10 determines individual control level L3 of this operator P as device control level L4 of predetermined notification device 200 (step S52). Upon determination that a plurality of operators P are related (Yes in S51), server 10 determines, as device control level L4, the highest one of individual control levels L3 of the plurality of operators p (step S53).

Server 10 executes these steps S51 to S53 on each notification device 200. Accordingly, each device control level L4 is determined. Server 10 then determines the details of notification to notification device 200 in accordance with device control level L4 determined in step S50, and outputs a control command to notification device 200, based on the determined details of notification (step S60). Through these steps S10 to S60, the control method is executed.

In this manner, the control method includes: step S10 of determining group control level L1, step S20 of determining attribute-dependent control level L2; step S30 of determining on individual control level L3; step S40 of generating the correspondence among moving body 300, operator P, and notification devices 200; step S50 of determining device control level L4; and step S60 of outputting a control command to notification device 200. This allows proper control of notification device 200 that provide traffic information.

[Variation of Notification Device]

A variation of notification device 200 included in control system 1 according to the embodiment will be described. An example will be described in this variation where notification device 200 is located on moving body 300.

Figure 22:
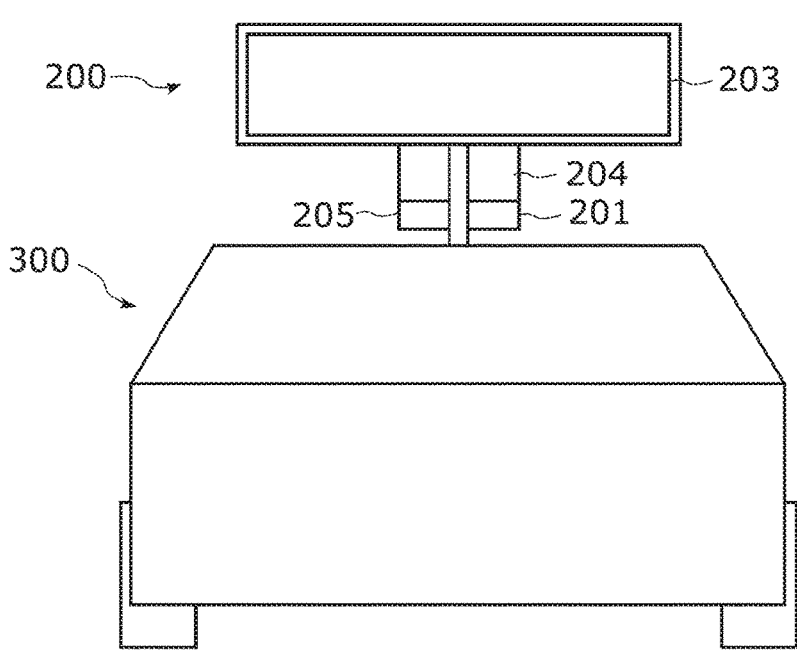
FIG. 22 shows another example of the notification device included in the control system according to the embodiment.

FIG. 22 shows another example of notification device 200 included in control system 1.

As shown in FIG. 22, notification device 200 is located on the roof of a vehicle which is moving body 300. Notification device 200 according to the variation also includes communicator 201, display 203, sound outputter 204, and controller 205. Display 203 is not necessarily horizontally long but may be vertically long. Like in the embodiment, device control level L4 is set to this notification device 200 as well.

For example, if device control level L4 is set to be "low", notification device 200 on moving body 300 may provide traffic information, using display 203 and sound outputter 204. For example, if device control level L4 is set to be "medium", moving body 300 may change the orientation of moving body 300 to allow a person who will receive traffic information to notice the display of notification device 200. For example, if device control level L4 is set to be "high", moving body 300 may approach a person who will receive traffic information and provide the traffic information.

OTHER EMBODIMENTS

While the control method and the control system according to one or more aspects of the present disclosure has been described above based on the embodiment, the present disclosure is not limited to the embodiment. The present disclosure may include forms obtained by various modifications to the foregoing embodiment that can be conceived by those skilled in the art or forms achieved by freely combining the elements and functions in the foregoing embodiment without departing from the scope and spirit of the present disclosure.

For example, an example has been described above in the embodiment where each control level is divided into three stages of "low", "medium", and "high". The division is however not limited thereto. Each control level may be divided into four or more stages. Each control level may be represented by numerical values.

An example has been described above in the embodiment where group control level L1, attribute-dependent control level L2, individual control level L3, and device control level L4 are all divided into three stages. The division is however not limited thereto. The number of stages of the control levels may be different.

An example has been described above in the embodiment where device control level L4 is set, which changes every moment. To address the problem, control system 1 may confirm the safety of the surroundings of notification device 200, when device control level L4 is to be changed. For example, if notification device 200 includes a camera, control system 1 may change device control level L4 after checking the surroundings, using this camera.

An example has been described above in the embodiment where notification device 200 provides traffic information. There is however no need for notification device 200 to always provide traffic information. For example, assume that control system 1 obtains a possible route of moving body 300 and there is no moving body 300 near notification device 200. In this case, control system 1 may set device control level L4 to be "low" and provide no excessive traffic information.

For example, assume that there a plurality of moving bodies 300 monitored by a plurality of operators P within a small area. In this case, control system 1 may determine the highest one of individual control level L3 of the plurality of operators P as device control level L4 in the small area.

For example, assume that there is work that cannot be handled by operator P with his/her operation skill. In this case, control system 1 may change the person in charge of this work to another operator P and reassign moving bodies 300 to be monitored to operators P.

An example has been described above in the embodiment where notification device 200 is remotely operated in control system 1 in order to ensure the safety of people. The purpose is however not limited thereto. For example, control system 1 may inform and guide an autonomous driving vehicle, using notification device 200 in order to avoid a traffic jam or detour around a construction site.

An example has been described above in the embodiment where control system 1 controls notification devices 200. The configuration is however not limited thereto. Control system 1 may remotely operate moving bodies 300 themselves. For example, control system 1 may remotely control the travel path of a vehicle in order to avoid a traffic jam or detour around a construction site.

INDUSTRIAL APPLICABILITY

The present disclosure is useful as a control method for remotely operating the traffic infrastructure related to autonomous driving service.

The invention claimed is:

1. A control method to be performed by a control device, the control method comprising:

determining first information indicating a group control level, based on operation skills of a plurality of operators who each perform remote monitoring or remote operation on a moving body, the group control level being required for a group of the plurality of operators to perform the remote operation, the control level indicating a degree to which a notification device assists the operator in the remote operation on the moving body, the notification device notifying people around the moving body;

determining second information indicating an attribute-dependent control level, based on attribute information on the plurality of operators, and determining third information indicating individual control levels of the plurality of operators, based on the first information and the second information, the attribute-dependent control level being required for each of the plurality of operators to perform the remote operation;

identifying one or more moving bodies each of which is the moving body present within a predetermined range from a predetermined notification device;

determining fourth information indicating a device control level for controlling the predetermined notification device based on individual control levels indicated by the third information of operators of the one or more moving bodies identified as being present within the predetermined range from the predetermined notification device;

based on the fourth information, determining a method of notification performed by the predetermined notification device to notify people of approach of the one or more moving bodies, the method of notification being determined from among a plurality of methods of notification including at least a first method of notification, a second method of notification, and a third method of notification; and controlling the predetermined notification device according to the determined method of notification, wherein the fourth information is determined to be a highest control level among individual control levels indicated by the third information of the operators of the one or more moving bodies identified as being present within the predetermined range from the predetermined notification device, wherein the predetermined notification device includes (i) a visual display for displaying visual traffic information according to one of a first mode and a second mode having more visual detail than the first mode and (ii) a speaker for outputting audible traffic information, wherein when the determined method of notification is the first method of notification, the predetermined notification device displays the visual traffic information according to the first mode using the visual display without outputting the audible traffic information using the speaker, wherein when the determined method of notification is the second method of notification, the predetermined notification device displays the visual traffic information according to the second mode using the visual display without outputting the audible traffic information using the speaker, and wherein when the determined method of notification is the third method of notification, the predetermined notification device displays the visual traffic information according to the second mode using the visual display and outputs the audible traffic information using the speaker.

2. The control method according to claim 1, wherein the third information is determined to be a higher one of the group control level according to the first information and the attribute-dependent control level according to the second information.

3. The control method according to claim 1, wherein the operation skills of the plurality of operators who each perform the remote operation on the moving body depend on proficiency levels of the plurality of operators.

4. The control method according to claim 1, wherein the group control level is determined based on a percentage of ordinary operators among all of the plurality of operators in the group, the ordinary operators having less than a predetermined time period of experience performing the remote monitoring or the remote operation on the moving body.

5. The control method according to claim 1, wherein the attribute information includes information on at least one of a certification held by the operator, an achievement of the operator, or an amount of work in progress, or a detail of work in progress.

6. The control method according to claim 1, wherein the notification device is placed in a movable range of the moving body.

7. The control method according to claim 1, wherein the notification device includes a plurality of notification devices at least one of which is mounted on the moving body.

8. The control method according to claim 1, wherein the moving body is an autonomous driving vehicle.

9. A control system comprising:

a plurality of operation terminals that receive input operations from a plurality of operators, the plurality of operators each performing remote monitoring or remote operation on a moving body;

a plurality of notification devices, each providing traffic information on the moving body; and a server that controls the plurality of notification devices in response to the input operations, wherein the server;

determines first information indicating a group control level, based on operation skills of the plurality of operators, the group control level being required for a group of the plurality of operators to perform the remote operation;

determines second information indicating an attribute-dependent control level, based on attribute information on the plurality of operators, the attribute-dependent control level being required for each of the plurality of operators to perform the remote operation;

determines third information indicating individual control levels of the plurality of operators, based on the first information and the second information;

obtains moving body information on one or more moving bodies each of which is the moving body present within a predetermined range from a predetermined notification device, the predetermined notification device being included in the plurality of notification devices;

determines fourth information indicating a device control level for controlling the predetermined notification device based on individual control levels indicated by the third information of operators of the one or more moving bodies identified as being present within the predetermined range from the predetermined notification device;

based on the fourth information, determines a method of notification performed by the predetermined notification device to notify people of approach of the one or more moving bodies, the method of notification being determined from among a plurality of methods of notification including at least a first method of notification, a second method of notification, and a third method of notification; and controls the predetermined notification device according to the determined method of notification, wherein the fourth information is determined to be a highest control level among individual control levels indicated by the third information of the operators of the one or more moving bodies identified as being present within the predetermined range from the predetermined notification device, wherein the predetermined notification device includes (i) a visual display for displaying visual traffic information according to one of a first mode and a second mode having more visual detail than the first mode and (ii) a speaker for outputting audible traffic information, wherein when the determined method of notification is the first method of notification, the predetermined notification device displays the visual traffic information according to the first mode using the visual display without outputting the audible traffic information using the speaker, wherein when the determined method of notification is the second method of notification, the predetermined notification device displays the visual traffic information according to the second mode using the visual display without outputting the audible traffic information using the speaker, and wherein when the determined method of notification is the third method of notification, the predetermined notification device displays the visual traffic information according to the second mode using the visual display and outputs the audible traffic information using the speaker.

* * * * *